May 4, 1954  E. D. LEON  2,677,745
ELECTRODE HOLDER
Filed Sept. 15, 1951
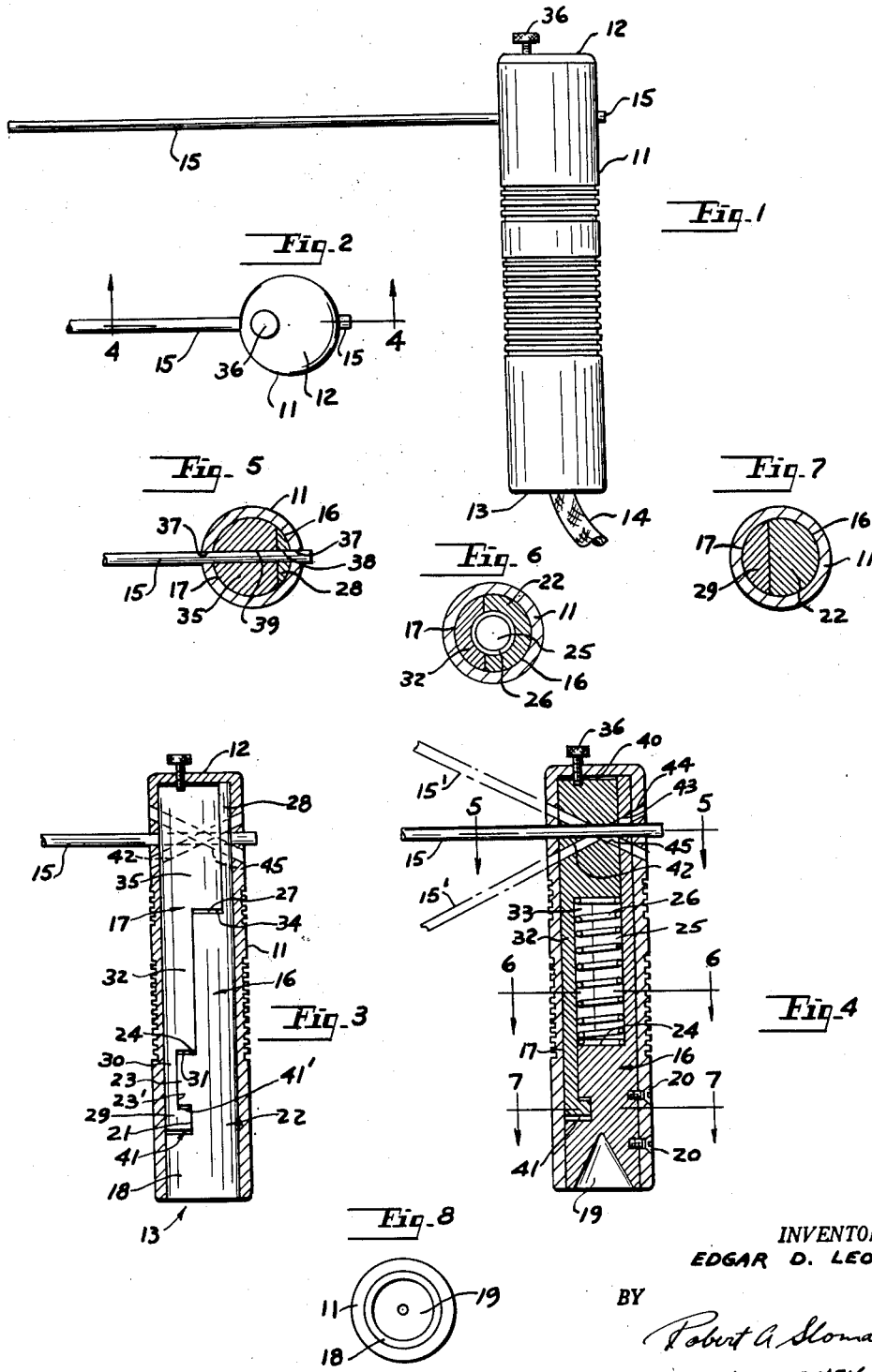
INVENTOR.
EDGAR D. LEON.
BY Robert A. Sloman
ATTORNEY Patented May 4, 1954

2,677,745

UNITED STATES PATENT OFFICE 2,677,745

ELECTRODE HOLDER

Edgar D. Leon, Detroit, Mich.

Application September 15, 1951, Serial No. 246,775

3 Claims. (Cl. 219—8)

This invention relates to electrode holders, and more particularly, to a novel electrode holder construction, which is clearly simplified over other constructions heretofor available and which is fully effective for its intended purpose.

It is the further object of this invention to provide a pair of relatively movable grips within an elongated insulated housing together with transverse slots formed through the housing and grips so arranged as to retainingly receive a welding electrode in a clearly simplified manner.

These and other objects will be seen from the following specification and claims in conjunction with the appended drawing in which:

Fig. 1 is a side elevational view of the present electrode holder with electrode attached.

Fig. 2 is a fragmentary plan view thereof.

Fig. 3 is an elevational view of the electrode holder with the housing cut away and sectioned for illustration.

Fig. 4 is an elevational section of the electrode holder.

Fig. 5 is a section taken on line 5—5 of Fig. 4.

Fig. 6 is a section taken on line 6—6 of Fig. 4.

Fig. 7 is a section taken on line 7—7 of Fig. 4; and

Fig. 8 is a bottom plan view of the electrode holder.

It will be understood that the above drawing illustrates merely a preferred embodiment of the invention and that other embodiments are contemplated within the scope of the claims hereafter set out.

Referring to the drawing, the present electrode holder consists of the non-conductive insulating hollow housing 11, which is preferably cylindrical in shape and is closed at one end as at 12. Said housing is constructed of any suitable plastic or non-plastic substance, which is electrically non-conductive, and which is also a heat insulator.

The opposite end of housing 11 is open as at 13 to permit the assembly of the electrode grips hereafter described as well as to permit the introduction of the wire or cable 14 for connection to one of the grips.

Fig. 1 shows the elongated cylindrically shaped conventional welding electrode rod 15, which is arranged transversely of the longitudinal axis of housing 11 and retainingly projected therethrough in a manner hereafter described.

A pair of elongated electrically conductive grips 16 and 17 are interfitted and positioned within said housing and are adapted for relative longitudinal movement with respect to each other in the manner hereafter described.

The grips are preferably of an exterior cylindrical formation for cooperative engagement with the interior cylindrical surface of housing 11.

Generally, the grips 16 and 17 are so formed as to cooperatively engage one another, with one of the grips being anchored within the housing and with the other being adapted for movement towards the closed end of the housing in view of a coiled spring which is interposed between the two grips.

More particularly, as shown in Figs. 3 and 4, the stationary grip 16 has a lower cylindrical portion 18 which acts as a closure for the open end of housing 11, said portion 18 having a conical recess 19 within which may be inserted and suitably secured the end of the conductor 14 shown in Fig. 1.

The screws 20 extend through transverse openings in the wall of housing 11 and threadably engage the lower portion of grip 16 for securing the same immovably within said housing.

As shown in Figures 3, 4 and 7, there is a slotted portion 21 formed transversely across the cylindrical portion 22 of grip 16, arranged directly above cylindrical portion 18; and directly above the slot 21 is a lateral transverse projecting tongue or finger 23. The aforementioned slot 21 is adapted to cooperatively receive the inwardly projected tongue 29 or finger upon the lower end of grip 17; and at the same time there is formed a transverse slot 23' directly above the tongue 29, which is adapted to cooperatively receive tongue 23 of the grip 16.

It may be said that the tongues and grooves respectively of the grips 16 and 17 are so formed that said grips are interdigitated with respect to each other permitting limited longitudinal movement of grip 17 with respect to grip 16 in the manner hereafter described.

The upper portion of the tongue 23 thus defines a transverse ledge 24, which is normally slightly spaced from the under-cut ledge or surface 31 formed in grip 17 at the upper end of its transverse notch 23'.

The grip 16 above the tongue 23 is cylindrical in shape and is provided with a cylindrically shaped longitudinal recess 25, whose lower transverse wall coincides with the ledge 24 and provides a support for the lower end of coil spring 26.

The upper end of coiled spring 26 cooperatively bears against the transverse ledge 34 formed in grip 17, and which is spaced upwardly from the transverse portion 27 of grip 16.

The central cylindrical portion 22 of the stationary grip 16 terminates above ledge 27 in the narrow elongated strip 28 as illustrated in Figs. 3, 4, and 5.

The movable grip 17 including the tongue 29 has a narrow portion 30 corresponding to the transverse slot 23' which cooperatively receives the tongue or finger 23 of grip 16. The portion 30 above slot 23' terminates in the cylindrically shaped portion 32, which has a cylindrical recess 33 upon its interior, which cooperates with recess 25 for receiving spring 26, as shown in Fig. 4.

The cylindrical portion 32 terminates in the enlarged cylindrically shaped portion 35 which normally under the action of spring 26 would engage the interior surface of the top wall 12 of housing 11.

A non-electrically conductive bolt 36 extends loosely through an opening in housing wall 12 and threadably engages the portion 35 of movable grip 17 whereby said bolt acts as a manual means for effecting a longitudinal movement of grip 17 towards grip 16 against the action of the spring 26 to thus define the space 40 between grip 17 and top wall 12 as illustrated in Fig. 4.

Preferably, adjacent the closed end of housing 11, there is formed the transverse circularly shaped slot 37, which extends through the side walls of said housing for receiving electrode 15 as shown in Fig. 5.

There is also formed a transverse circular slot 38 within the upper end portion 28 of stationary grip 16, which slot 38 is aligned with slot 37.

There is also formed a transverse slot 39 within movable grip 17 which under the action of spring 26 is normally non-aligned with slots 37 and 38. However, a longitudinal thrust applied to bolt 36 is adapted to align slot 39 with slots 37 and 38 to permit the insertion of one end of electrode 15 therethrough.

Upon release of manual means 36 the spring 26 is constantly urging the grip 17 towards the closed end of housing 11 tending to move the slot 39 out of alignment with slots 37 and 38, so as to effectively grip the electrode 15 in the manner shown in Figures 3 and 4.

It will be understood that with the electrode 15 withdrawn, the grip 17 will move into engagement with the interior surface of wall 12 eliminating the space 40 shown in Fig. 4.

In the normal arrangement of the parts with the electrode 15 in position, it is apparent that there may be a space 41 between tongue 29 and the end wall of slot 21, as well as a space 41 between the upper surface of tongue 29 and the upper wall which bounds the slots 21. Thus, with the electrode in place, there is nothing retaining the movable grip 17 against upward movement except the electrode rod 15 itself.

It is also contemplated that there may be additional slots formed within the grips and the housing for receiving the electrode 15 in different angular positions, such as shown at 15', Fig. 4.

For this purpose, there is provided the angularly arranged slot 42 in movable grip 17, which is adapted for alignment with angularly arranged slot 43 and slot 44 in stationary grip 16 and housing 11 respectively.

Similarly, there may be formed the angularly arranged slot 45 in movable grip 17 adapted for alignment with a corresponding angularly arranged slot in stationary grip 16 and in housing 11 respectively.

It is understood here also that the movable slots within movable grip 17, due to the action of spring 26, are normally out of alignment with the corresponding slots in the stationary grip and in the housing. Thus, here also, the manual means 36 must be employed to move the slot of the movable grip into alignment with the slots in order to cooperatively receive the end of the electrode 15.

Having described my invention, reference should now be had to the claims which follow for determining the scope thereof.

I claim:

1. An electrode holder comprising a hollow non-conductive insulating housing closed at one end, a pair of elongated conductive interfitted relatively movable grips within said housing, both grips having outer housing engaging surfaces of the same radius to form a cylinder when assembled, means securing one of the grips to said housing, a coiled spring intermediate said grips tending to effect longitudinal movement of the other grip, manual means projecting through the closed end of said housing and joined to said movable grip for effecting a longitudinal movement thereof against the action of said spring, said housing and said stationary grip having formed therein aligned transverse slots adapted to cooperatively receive a welding electrode, said movable grip having a transverse slot normally in non-alignment with said first slots and alignable therewith on application of said manual means to retainingly receive said electrode, said grips being formed with opposed slots and interdigitated fingers limiting the relative longitudinal movements of said grips and for retaining said grips in assembled relation independent of said housing, said grips having opposed central slotted portions of cylindrical shape and the same internal radius intermediate their ends forming a cylindrical enclosure for said coiled spring.

2. An electrode holder comprising a hollow non-conductive insulating housing closed at one end, a pair of elongated conductive interfitted relatively movable grips within said housing, both grips having outer housing engaging surfaces of the same radius to form a cylinder when assembled, means securing one of the grips to said housing, a coiled spring intermediate said grips tending to effect longitudinal movement of the other grip, manual means projecting through the closed end of said housing and joined to said movable grip for effecting a longitudinal movement thereof against the action of said spring, said housing and said stationary grip having formed therein aligned transverse slots adapted to cooperatively receive a welding electrode, said movable grip having a transverse slot normally in non-alignment with said first slots and alignable therewith on application of said manual means to retainingly receive said electrode, one of said grips having a transverse slot formed in its interior portion, and the other of said grips having a laterally projecting tongue loosely engagable within said latter slot for limiting the relative longitudinal movements between said grips and for retaining said grips in assembled relation independent of said housing.

3. An electrode holder comprising a hollow non-conductive insulating housing closed at one end, a pair of elongated conductive interfitted relatively movable grips within said housing, both grips having outer housing engaging surfaces of the same radius to form a cylinder when assembled, means securing one of the grips to said housing, a coiled spring intermediate said grips tending to effect longitudinal movement of the other grip, manual means projecting through the closed end of said housing and joined to said movable grip for effecting a longitudinal movement thereof against the action of said spring, said housing and said stationary grip having formed therein aligned transverse slots adapted to cooperatively receive a welding electrode, said movable grip having a transverse slot normally in non-alignment with said first slots and alignable therewith on application of said manual means to retainingly receive said electrode, one of said grips having a transverse slot formed in its interior portion and a laterally projecting tongue adjacent thereto, the other of said grips having a laterally projecting tongue engageable with said first slot and a slot adjacent said latter tongue for loosely receiving said first tongue for limiting the relative longitudinal movements between said grips and for retaining said grips in assembled relation independent of said housing.

References Cited in the file of this patent

UNITED STATES PATENTS

| Number | Name | Date |
| --- | --- | --- |
| 2,340,496 | Sweet | Feb. 1, 1944 |
| 2,390,837 | Hill | Dec. 11, 1945 |
| 2,419,560 | Jepson | Apr. 29, 1947 |
| 2,453,768 | Hinnell | Nov. 16, 1948 |
| 2,457,193 | Winn | Dec. 28, 1948 |